D. D. MALLORY.
Quartz Mill.
No. 112,059.  Patented Feb. 21, 1871.
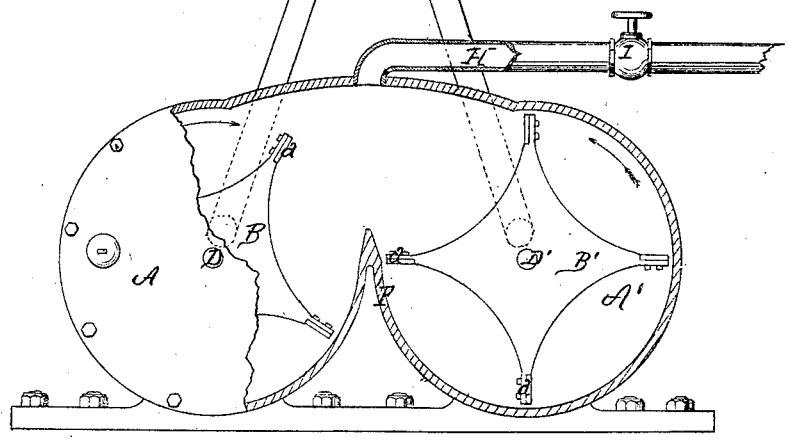
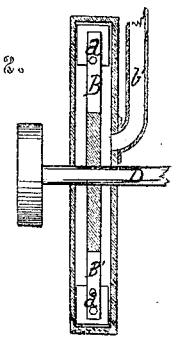

United States Patent Office.

DAVID D. MALLORY, OF MYSTIC BRIDGE, CONNECTICUT.

Letters Patent No. 112,059, dated February 21, 1871.

IMPROVEMENT IN QUARTZ-MILLS.

The Schedule referred to in these Letters Patent and making part of the same.

*To all whom it may concern:*

Be it known that I, DAVID D. MALLORY, of Mystic Bridge, in the county of New London and State of Connecticut, have invented a new and valuable Improvement in Quartz-Mills; and I do hereby declare that the following is a full, clear, and exact description of the construction and operation of the same, reference being had to the annexed drawing making a part of this specification, and to the letters and figures of reference marked thereon.

Figure 1 of the drawing is a representation of a central vertical section.

Figure 2 is a vertical cross-section.

My invention is an improvement on the quartz-mill for which a patent was granted to N. Goodwin, Jr., dated September 26, 1865, No. 50,115; and It consists in the form of the grinding-wheels, in the feeding and delivery-pipes, and in the regulating-valve applied to the exhaust-pipe, whereby it is designed to accomplish the crushing and pulverizing of quartz and other substance in a superior manner.

A A' represent two cast-iron cylinders, with an open space betwixt, as shown on the drawing.

Inside of these cylinders are revolving wheels or plates, B B', revolving toward the center, as indicated by the arrows.

On the ends of these wheels are fastened, with bolts and nuts, pieces of chilled or other hardened iron, which come in contact with the material to be crushed. These pieces are marked *a* on the drawing.

The wheels are secured on the shafts D D'.

These shafts turn in suitable bearings or boxes, and are driven with rapidity in direction of the arrows by means of belts on pulleys.

E represents the hopper, arranged over the center of the two cylinders. It is arranged to feed the material to be ground close to the axes of the wheels by means of the pipes *b b'*.

F represents an inclined ridge between the wheels, the object of which is to offer a resistance to the thrown material, and thus prevent it from shooting under the opposite wheels, and to assist in breaking the material to pieces.

The dust is carried off from the machine through the pipe H at the top by the current of air which is produced by the rotation of the grinding-wheels in the cylinder acting in the manner of a blower.

Any particles of material not sufficiently reduced in the first rotation fall by their own weight, and are again caught by the revolving arms and discharged again, and so on till the reduction is complete.

The draught of air is regulated by a valve, I, in the pipe H.

The draught, of course, will determine the fineness of the quartz-dust, as a light current of air will only blow off fine particles and a strong current large particles.

Claim.

The combination, with the double cylinder A A' and grinding-wheels B *a*, of the hopper E and its forked center feed-pipes *b b'*, and the exhaust-pipe H, provided with the regulating-valve I, when constructed and arranged to operate substantially as specified.

In testimony that I claim the above I have hereunto subscribed my name in the presence of two witnesses.

DAVID D. MALLORY.

Witnesses:
   GEO. W. MALLORY,
   THOS. E. PACKER.